Sept. 7, 1965 M. MÜLLER ETAL 3,204,701
HELICOPTER ROTOR CONSTRUCTION
Filed Oct. 12, 1962 6 Sheets-Sheet 1

Inventors
MARTIN MÜLLER, HANS DERSCHMIDT,
AND ALOIS SCHWARZ
By: McGlew and Toren 3,204,701
HELICOPTER ROTOR CONSTRUCTION
Martin Müller, Siegertsbrunn, near Munich, Hans Derschmidt, Munich, and Alois Schwarz, Ottobrunn, near Munich, Germany, assignors to Bölkow-Entwicklungen Kommanditgesellschaft, Ottobrunn, near Munich, Germany
Filed Oct. 12, 1962, Ser. No. 230,137
21 Claims. (Cl. 170—160.25)

This invention relates in general to helicopter rotor driving mechanisms and in particular to a new and useful pivot drive for rotor blades of helicopters which are mounted on a rotor head for rotation therewith and for pivotal movement in respect thereto, the drive including means for moving the leading blades in respect to the direction of flight at a lower circumferential speed than the trailing blades.

The present invention is an improvement in driving mechanisms for the pivotal movement of the rotor blades in respect to an improved hydraulic system which is arranged to move the rotor blades in respect to their pivotal mountings on the rotor head in a manner so that their overall rotational and pivotal movement will be tuned to the pendulum frequency of the rotor blades. It has been found in the operation of helicopters having pivotally mounted rotor blades that if the enforced course of the pivotal movement deviates from the ideal course of the free swing of the rotor blades as a centrifugal pendulum, great transmission loads will develop, for example, in each oscillation due to the differences in acceleration. These minor deviations in acceleration may be caused, for example, by deviation in the gearing mechanism which has been employed for operating the rotors in the manner described. In addition, when the helicopter is subject to unusual air currents which may occur during squalls or flattening out maneuvers of the helicopter, the gears of transmission are loaded by the absorption of great tangential forces acting on the blades, and since such transmissions cannot yield to the enforced movement, great damage is likely to ensue.

In accordance with the present invention, there is provided an improved hydraulic control system for controlling the pivotal movement of each rotor blade at its mounting on a rotating rotor head. The mechanism provided permits great acceleration differences between the enforced and the free swing of the rotor blades without the blades being subjected to great stresses. In accordance with a preferred arrangement, there are provided actuating pistons. Each blade is connected to one actuating piston for actuating the latter about its pivotal mounting on the rotor head. These pistons are moved in a controlled direction in accordance with hydraulic pressure emitted to alternate sides of their associated cylinders. The feature of the construction is that the actuating pistons move out of their precalculated path, such as may occur, for example, in the case of squalls.

The invention is based on the realization that pivotal deflection of the rotor parts can be made greater due to the additional mobility of the hydraulic members, than with control by rigid gearing means, and the path of the actuating pistons beyond an admissible distance can be limited by elastic stops in order to prevent damage to the rotor. Such stops may take the form, for example, of compressive springs arranged on the bottoms of the actuating cylinders, against which the pistons strike in their end positions.

In accordance with a preferred arrangement, the hydraulic system is advantageously arranged in the rotor shaft and the rotor head arms. By this means the aerodynamic resistance of the pivot drive is considerably reduced.

In accordance with another feature of the invention, two opposing rotor blades are controlled by a single hydraulic pump in helicopters having an even number of blades and the movement of the pump piston is transmitted to the pistons of two actuating cylinder and piston assemblies. The pistons are associated with the rotor blades and the actuating assemblies are connected hydraulically in series. The arrangement results in a particularly great simplification and saves a great deal of space and weight for a system of this nature.

Accordingly, it is an object of this invention to provide an improved transmission mechanism for a helicopter rotor.

A further object of the invention is to provide a hydraulic transmission for controlling the pivotal movement of the rotor blades of a helicopter which are pivotally mounted on a rotating rotor head at their inner ends which transmission includes hydraulic control means for pivoting the rotor blades so that their movement is tuned to the pendulum frequency of such blades.

A further object of the invention is to provide hydraulically operated systems for pivotally driven rotor blades which are pivotally mounted at their inner ends on a rotatable rotor head which comprise one actuating piston each connected to the respective blade for effecting such pivotal movement operating in an actuating cylinder in which the opposite sides may be selectively pressurized under the control of the hydraulic pump and including equalizing channels in the actuating cylinder to provide a slip for the operation of the actuating piston.

A further object of the invention is to provide a hydraulic system for operating the pivotal movement of helicopter rotor blades which includes an actuating piston which is moved backwardly and forwardly under the control of the pressure admitted from a hydraulic pump and which includes one or more equalizing channels to permit slippage of the drive and avoid overloading of the blades during the operation thereof.

A further object of the invention is to provide a pivot drive for rotor blades of helicopters characterized in means insuring that each rotor blade is driven by a periodically running hydraulic system adapted to the pendulum frequency of the rotor blade.

A further object of the invention is to provide a hydraulic drive for the pivotal movement of rotor blades of helicopters which is simple in design, economical to manufacture and rugged in construction.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are described preferred embodiments of the invention.

In the drawings:
FIG. 1 is a schematic representation of a periodically running hydraulic system provided to pivotally move a helicopter rotor blade;
FIG. 2 is a fragmentary perspective partly in section of a helicopter rotor with a hydraulic pivot drive constructed in accordance with the invention;
FIG. 3 is a view similar to FIG. 2 of another embodiment of the invention;
FIG. 4 is a schematic representation of a hydraulic drive for a six-blade rotor, wherein each pair of opposing blades is controlled by a single hydraulic pump which is actuated by a common wobble plate;

Figure 1:
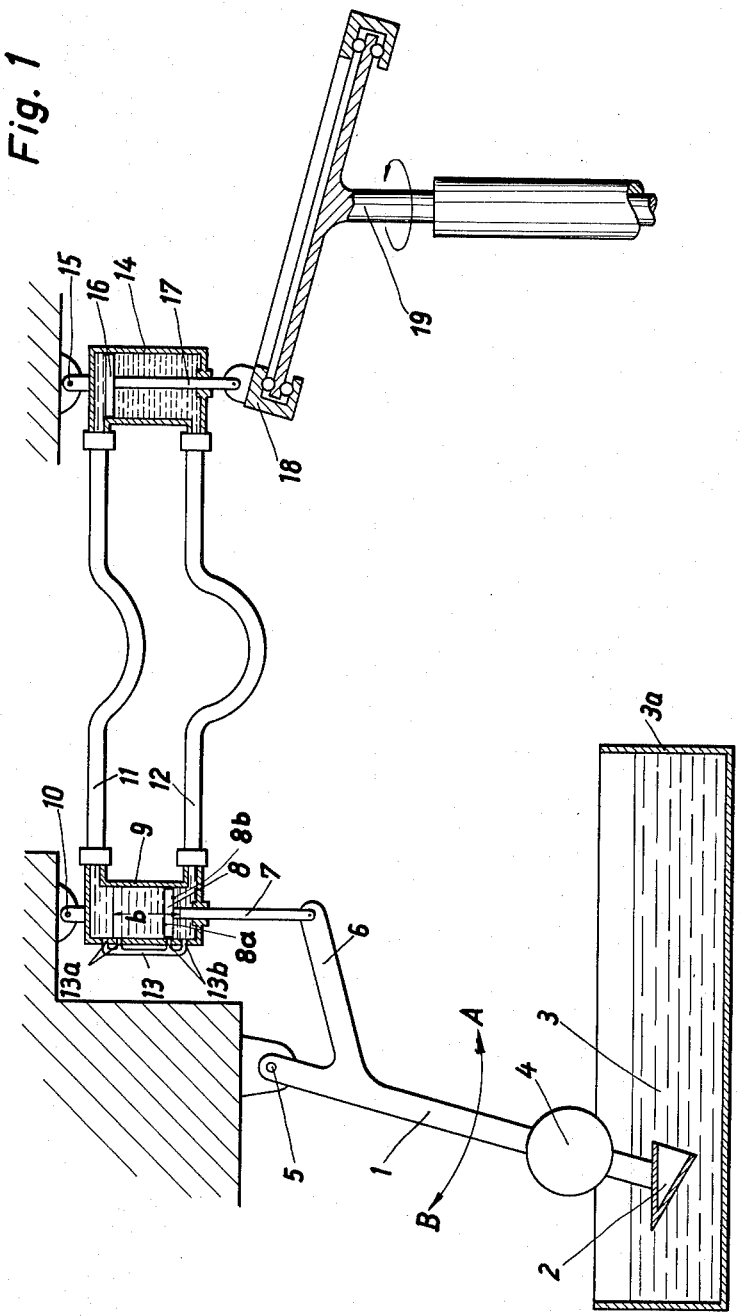

Referring to the drawings in particular, in FIG. 1 is indicated a schematic representation of a hydraulic system for operating a helicopter rotor blade which is indicated in simplified form as a blade or pendulum 1 which is pivotally mounted at 5. The drawing indicates schematically the external forces acting on the revolving rotor blade 1 by the damping device which consists of a conical container 2 affixed to the outer end of the rotor blade and which is pointed at one end and open at the opposite end and arranged to move in a fluid or liquid 3 in a reservoir 3a. The operating mechanism for moving the pendulum or rotor 1 offers a greater resistance to the pendulum deflections in the direction of the arrow A than to deflections in the direction of the arrow B. The pendulum can be so adjusted by means of a shiftable weight 4 that it moves approximately in coincidence with the frequency of the driving gear.

The pendulum 1, pivoting about the stationary bearing 5, is driven through a lever arm 6 which is pivotally connected at a free end to a connecting rod 7. The rod 7 is secured to one end of an actuating piston 8 of a hydraulic system provided in accordance with the invention. The actuating piston 8 moves in an actuating cylinder 9 which is pivotally mounted on pivot pin 10. The cylinder is connected at opposite ends to a hydraulic pump by conduits 11 and 12 which are alternately pressurized.

In accordance with the invention an equalizing channel 13 is provided to connect to opposite ends of the cylinder 9 through two axially spaced sets of bores 13a and 13b which extends through the jacket of the cylinder. As indicated, the piston moves through a stroke indicated by b which extends from a location between the sets of bores 13a, 13a on one end of a location between the sets of bores 13b, 13b at the opposite end. A fluid exchange takes place in the operation of the piston depending upon the direction of the pressure gradient, through the equalizing channel 13. If the transmission pressure forces are symmetrical both in the forward and reverse run of the rotor 1 the amount of overflowing leakage fluid is also equal. However, if there are unbalancing forces which cause the actuating piston stroke to shift toward the bottom such as when the pendulum moves in the direction of the arrow A, and there is the great dampening of the pendulum caused by the fluid 3 acting on the container 2, then the edges 8a and 8b of the piston close part of the bores 13b while leaving all bores 13a in the upper dead center position open. An over pressure is produced in the bottom dead space of the actuating cylinder adjacent the bores 8b. The bottom dead space loses little oil through passage 13 since one set of the bores 8b are closed but the upper bores are open, which permit flow equalization of the fluid, pushing back the actuating piston into the desired stroke path.

The hydraulic pump 14 is pivotally mounted on pivot pin 15 at its one end and includes a piston 16 which is reciprocated to alternately move fluid through the conduits 11 and 12. The piston 16 is driven by a wobble plate 18 which is articulated by means of a rotatable member 19. The speed of the wobble plate drive member 19 may be slightly higher or lower than the pendulum frequency. The volume of the pump 14 is greater by that amount of leakage fluid flowing through the equalizing channel 13 than the volume of the cylinder 9. Corresponding to the necessary work characteristics the number of bores 13a and 13b on the actuating cylinder can be increased along with the number of equalizing channels 13.

Figure 2:
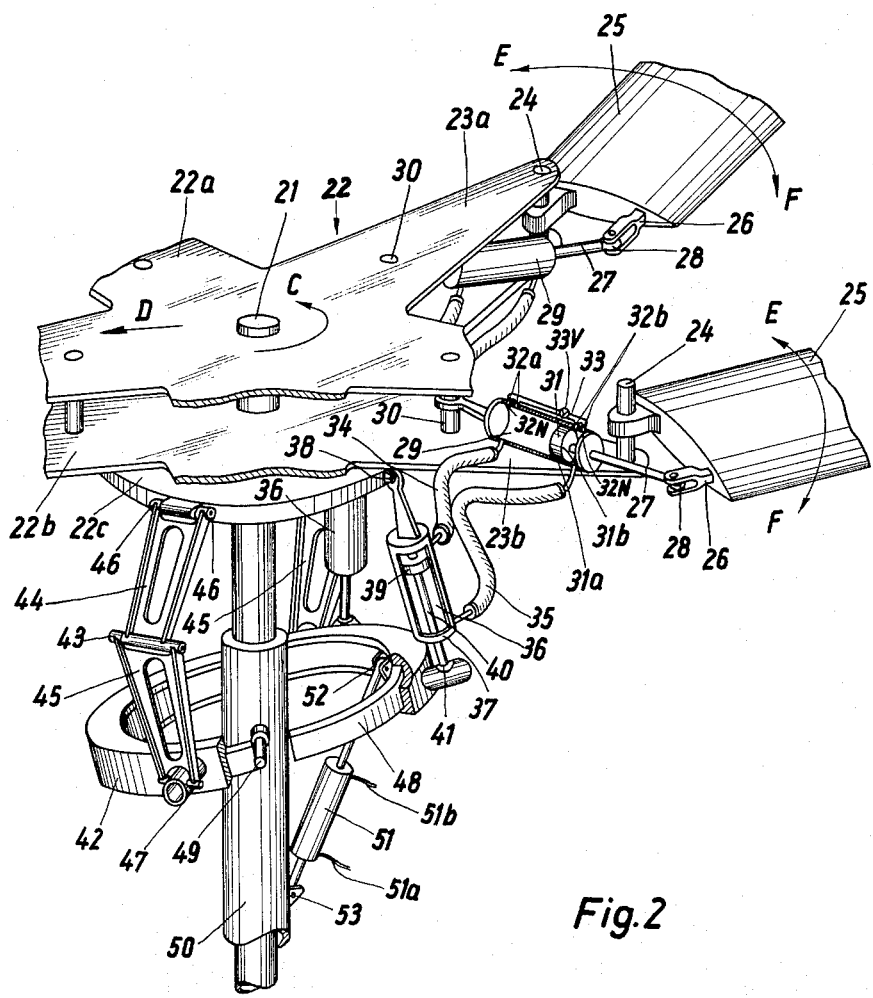

In FIG. 2 the application of the invention is shown in respect to the helicopter rotor construction. The rotor construction includes a rotor shaft 21 which is rotated in the direction of the arrow C. A rotor head generally designated 22 is affixed to the shaft 21 for rotation therewith and is formed by disks 22a, 22b and 22c. Rotor blades 25 are pivotally mounted at the end of bifurcated arms 23a, 23b by means of rotor head pins 24 to permit a superimposed pivotal movement of the blades 25 in the directions of either of the arrows E or F. In the drawing of FIG. 2, only two blades are indicated for clarity of illustration purposes.

The pivotal drive of the rotor blades 25 is effected by means of hydraulic actuating cylinders 29 which are pivotally mounted on the rotor head on pivot pins 30. An actuating piston 31 is reciprocable in the cylinder 29 in accordance with the pressurizing of the opposite ends of the cylinder effected through pressure conduits 34 and 35 alternately. Each piston 31 is provided with a piston rod 27 which is pivotally connected at its free end to a pivot pin 28 held by the bracket element 26 secured to the associated rotor blade 25 at a spaced location from its pivotal mounting at 24.

In the representation according to FIG. 2 the rotor frequency is slightly above the natural frequency of the rotor blades so that the dead spaces of the working cylinder 29 have an overpressure compared to the large space of the same cylinder. With an assumed flight course, for example, the direction of the arrow D, the pivotal movements of the rotor blades encounter varying summation forces in the pendulum directions E and F so that the actuating piston could move out of its precalculated path.

An equalizing channel or passage 33 interconnects opposite sides of the actuating cylinder 29 by means of bores 32a, 32a, and 32b, 32b provided at each end of the cylinder. If the actuating piston 31 moves out of its precalculated path which extends between the bores 32a and 32b, the edges 31a and 31b of the actuating piston 31 close on one side of the cylinder some of the bores while all the bores provided on the opposite side of the actuating cylinder are left open in the other dead center position.

The conduits 34 and 35 are pressurized periodically by a pump means such as a hydraulic pump 36. A cylinder 37 of the pump 36 is pivoted at 38 on the disk 22c of the rotor head 22 and its associated pump piston 39 is reciprocated in the pump cylinder and is provided with a connecting rod 40 which has a free end which is pivoted in a ball and socket joint 41. The ball and socket joint 41 is carried at the outer periphery of an outer ring 42 of a wobble plate. A follower 43, comprises pivotally connected members 44 and 45 which are pivoted at one end to the rotor head at pivot 46 and at the opposite end to the wobble plate at 47. The outer ring 42 of the wobble plate rotates synchronously with the shaft 21 and the rotor head 22 via the articulated follower 43 and drives the pivoted pump 36. The inner ring 48 of the wobble plate is pivoted in a journal bearing 49 which is carried on a stationary sleeve 50 and extends perpendicularly to the shaft 21. A hydraulic working strut 51 is pivotally connected at 53 to the sleeve 50. Conduits 51a and 51b are connected to the cylinder 51 for the purpose of admitting pressure to the opposite sides thereof for controlling the position of the inner ring 48.

Since the rotor speed is slightly higher than the natural frequency of the rotor blades, there is an overpressure in the respective dead space of the working cylinder 29 compared to the larger space of the same cylinder. Consequently, a small amount of fluid flows with each reversal of the working piston 31 from the dead space through the channel 33 into the large cylinder space. With a cyclic pendulum movement the amount of overflowing fluid is equal for both end positions, so that the center position is maintained. When the rotor blade is displaced from the center position by unsymmetrical loads, such as air forces, a smaller and a larger dead space are formed. Since the smaller dead space has few or no bypass apertures, it loses little or no leak oil in the reversal phase of the piston. Since the larger dead space has numerous bypass apertures, it loses a certain amount of leak oil and the piston 31 experiences a slight delay and is thus returned to the center position. The bores 32a and 32b may advantageously be arranged with interchangeable nozzles 32n with exactly defined diameters for the purpose of fine control of the fluid flow through an equalizing channel or line 33. In addition, the equalizing channel 33 may advantageously include a throttle valve 33v. By means of the throttle valve and the interchangeable nozzles and by a corresponding arrangement of the position and the number of the bores of the equalizing channels, the system can be adapted to any preexisting conditions.

Figure 3:
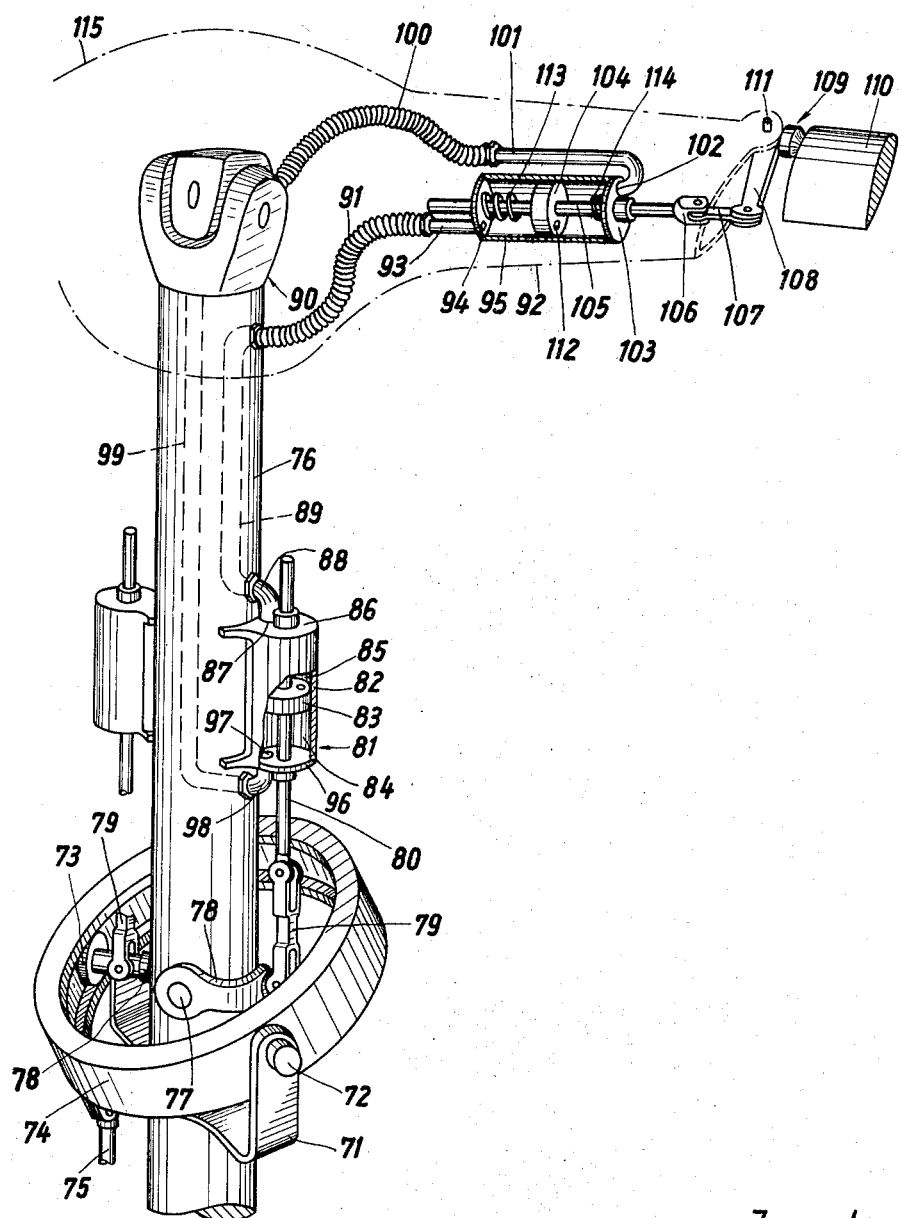

In FIG. 3, another embodiment of the invention is indicated. A yoke element 71 is supported on a fixed element of the aircraft and includes pivot element 72 for supporting a wobble plate 74 transversely to the axis of the helicopter rotor. The wobble plate 74 can be inclined in a known manner with regard to its particular position in respect to a rotor shaft 76 by means of a steering rod 75 connected thereto. On the circumference of the rotor shaft 76 there are arranged a number of journals 77 extending perpendicular to the rotor shaft corresponding to the number of rotor blades. In this embodiment, only two rotor blades are employed for the rotor and only two opposing journals are provided on the circumference of the rotor shaft. On each journal 77 are pivoted levers 78 (only one of which is indicated) whose free ends are guided by means of rollers 73 (shown on the partially indicated lever 78) which are guided on the inner circumference of the wobble plate 74. A connecting rod 79 is pivoted at its outer end to the levers 78 and the other end engages a piston rod 80 of a hydraulic pump 81. The piston 83 slides in a cylinder 82. Alternate sides of the cylinder 82 are pressurized by reciprocating the piston 83 which is connected to the rod 80.

The piston 83 subdivides the interior of the cylinder into two compartments 84 and 85. On the upper cylinder bottom 86 of the cylinder 82 there is provided an orifice 87 to which is connected a fluid pipe 88 which is arranged with its extended part 89 in the interior of the rotor shaft 76. The fluid pipe 88 rises up to a Cardan joint 90 of the rotor head 115 (indicated by broken lines) and bypasses the Cardan joint through a flexible tube 91 which in turn is connected to a fixed pipe 93 arranged within an arm 92 of the rotor head. The opposite end of the pipe 93 is connected to a hydraulic actuating cylinder 95 which is likewise secured within the arm 92 of the rotor head. On the bottom of the hydraulic pump 81 there is provided an opening 97 which is connected to a second fluid pipe 98 having a part 99 extending upwardly in the interior of the rotor shaft 76. The pipe 99 is also connected over a tube 100 which bypasses the Cardan joint 90 and connects to a fixed pipe 101 arranged within the arm 92 of the rotor head. The pipe 101 opens into an orifice 102 into the cylinder bottom 103 of the actuating cylinder 95. Inside the latter is arranged a piston 104 which is secured on a piston rod 105 guided on both sides within the cylinder bottoms 94 and 103.

The connecting rod 105 is pivoted to a connecting rod 107 by means of a pivot connection 106. The lever 107 in turn is pivoted to an arm 108 of an angle lever 109 which is perpendicular to the rotor blade 110. The angle lever 109 is pivotally mounted at 111 within the arm 92.

In this embodiment, as indicated in FIG. 3, instead of the equalizing channels there is provided a bore 112 defined in the piston 104. In addition, compression springs 113 and 114 are arranged inside the actuating cylinder 95 adjacent the opposite ends 94 and 103 of the cylinder. The compression springs 113 and 114 serve as elastic stops when the piston 104 moves too far off its precalculated position. All of the hydraulic cylinders and connecting conduits are completely filled with hydraulic fluid.

When the wobble plate 74 is inclined and the rotor shaft 76 rotates, the levers 78 swing up and down during a revolution of the rotor shaft and transmit this oscillation over the connecting rod 79 to the piston 83, which is displaced correspondingly in the cylinder 82. Due to the movement of the piston 83, the piston 103 supported in the cylinder 95 is likewise moved back and forth over the fluid columns in the pipes 88, 89, 91, 93 and 98, 99, 100 and 101, respectively. The movement of the piston 104 is transmitted over the piston rod 105 and the arm 108 of the angle lever 109 to the rotor blade 110, which swings back and forth about the pivot 111. Due to the relatively rigid behavior of the fluid column in the pipes and cylinders, the pivotal movement is likewise transmitted rapidly and accurately to the rotor blade with each shift of the wobble plate, as it is in the case of rigid gear transmissions, for example.

The arrangement of the equalizing bore 112 in the piston 104 as well as the equalizing channels shown in FIGS. 1 and 2 has the additional advantages that the rotor blade 110 can yield slightly to the rigid movement in case it encounters great tangential forces, so that peak forces or stresses may be reduced. The elastic stops consisting of the compression springs 113 and 114 prevent the pivotal movement from increasing beyond the anticipated extent so that a hard impact of rotor parts is avoided. In the case of knocking movements of the rotor head 115 in relation to the rotor shaft 76, the relative movement between these parts does not offer any difficulties for the fixed laying of the fluid pipes inside the rotor shaft in the arm 92 of the rotor head, since the fixed pipes are interconnected by means of flexible tubes 91 and 100, respectively.

Figure 4:
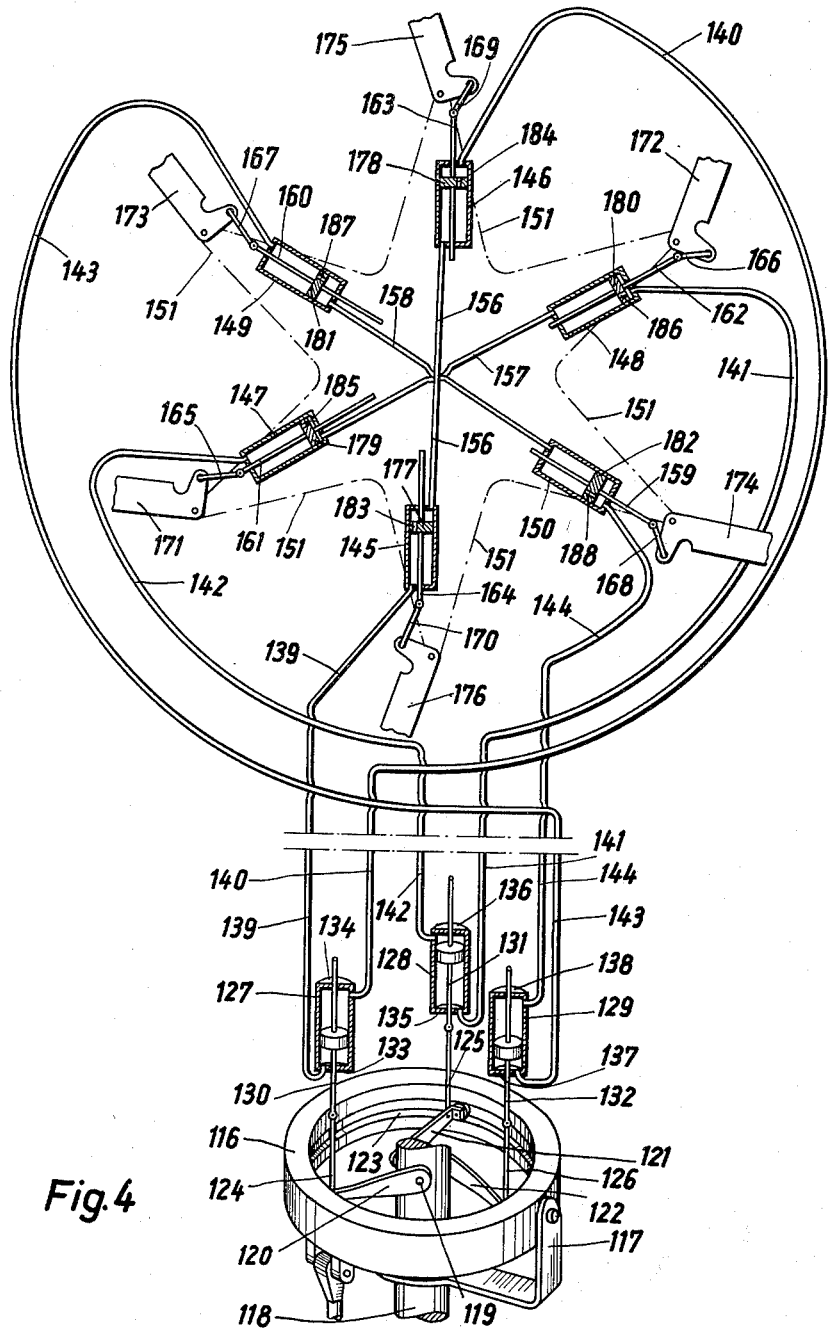

In FIG. 4 there is indicated a schematic representation of the hydraulic drive for a six-blade rotor wherein two opposing blades of each set are controlled according to the invention by a common wobble plate by means of a single hydraulic pump. In FIG. 4, the mechanical control mechanism corresponds to that of the figure just explained. The wobble plate 116 is tilted in a fixed frame 117 at a location around a rotor shaft 118. On the circumference of the rotor shaft are provided three journal pins 119 which extend perpendicularly to the shaft and on each journal are pivoted levers 120, 121 and 122 which have ends with rollers which ride on a guide groove 123 provided at the inner circumference of the wobble plate 116. Connecting rods 124, 125 and 126 are pivotally connected to the levers 120, 121 and 122, respectively, at their one end and on opposite ends are connected to piston rods 130, 131 and 132 of three hydraulic pumps 127, 128 and 129 located on the rotor shaft, but schematically shown. The piston rods 130, 131 and 132 are guided respectively on both sides of the cylinder bottoms 133 and 134, 135 and 136, 137 and 138. To the lower and upper cylinder bottoms are connected pipes 139 and 140, 141 and 142, 143 and 144, respectively, which lead to hydraulic actuating cylinder and piston assemblies 145, 146, 147, 148, 149 and 150, respectively. The opposing actuating assemblies 145 and 146, 147 and 148, 149 and 150 are arranged hydraulically in series according to the invention and are located within the rotor arms 151 and each actuating assembly is associated with a respective rotor blade. Opposing pumps 145 and 146, 147 and 148, and 149 150 are connected directly to pipes 156, 157 and 158, repectively. Each actuating assembly 145 to 150 is connected over a piston rod 159, 160, 161, 162, 163 and 164 guided in cylinder bottoms and through a connecting rod 165, 166, 167, 168, 169 and 170 articulated thereto to angle levers 171, 172, 173, 174, 175 and 176 secured on the associated rotor blades.

In order to insure the elasticity of the rotor blades in relation to the rigid movement transmitted thereto in the event that tangential forces are encountered, for example, in squalls, and in order to prevent the piston from articulating each blade to move it off its precalculated path, the pistons 177 to 182, supported in the actuating assemblies 146 to 150 are provided with equalizing bores 183 to 188, respectively. Instead of the equalizing bores defined in each piston, it also is possible to provide the equalizing channels as in the other embodiments indicated in FIGS. 1 and 2. All of the cylinder and connecting conduits are advantageously filled with hydraulic fluid.

When the rotor shaft 118 is rotated and the wobble plate 116 is inclined, a periodic ascending and descending movement is forced upon the levers 120, 121 and 122. Due to the above described connecting system between the pump cylinders and actuating cylinders arranged in the rotor head, one pump cylinder operated from the wobble plate admits two opposing actuating cylinders. Thus, the associated rotor blades for the cylinders are turned in opposite directions by the same rotary angle so that the trailing blade is advanced and the leading blade is pulled backwardly in equal angular amounts.

The conception indicated in FIG. 4 is of particular advantage in that the entire driving mechanism is substantially easier and simpler than in the case of a strictly mechanical driving system or in a hydraulic system where one hydraulic pump is provided for each rotor blade.

Under normal load acting on the blades, the damping force of the hydraulic fluid in the equalizing bores or channels is sufficient to move the blades by force. But when greater forces appear on the rotor blades in a tangential direction, the operating element can be made to yield to the unbalancing forces so that a part of the hydraulic fluid flows through the equalizing bores or channels from one cylinder compartment to another. In this manner, the mechanical pivot drive for each rotor blade is protected against excessive loading and can thus be designed and made with a substantially reduced strength in respect to constructional configuration as well as material. Thus, the blade element may be made with a lower weight.

In FIG. 5 to FIG. 12, the details of construction of the actuating cylinder and piston assembly comparable to that in FIG. 2 are shown. Piston 31 moves through a normal actuating stroke equal to $h$ from the solid line position to the dotted line position indicated FIG. 5. The conduits 34 and 35 open into the cylinder through port 29a, 29a at each end thereof. The space 54 in front of the piston at one end and beyond the piston at the opposite end is the dead space in which the piston does not normally operate. When the drawing frequency of the wobble plate 42 and of the pump piston 39 respectively, is slightly above the natural frequency of the operating rotor blade $W>We$, the fluid does flow through the equalizing channel 33 in accordance with the movement of the piston.

Figure 6:
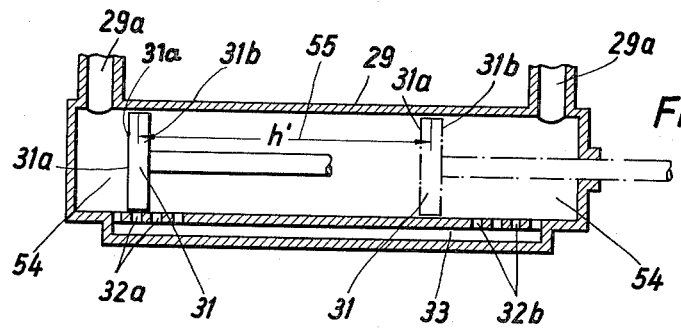
FIG. 6 is a view similar to FIG. 5 with the piston shown in a moved out position.

In FIG. 6, the actuating piston 31 is indicated in an off-course position in which it moves through the path $h'$. Such a movement may be caused, for example, by an unbalancing force on the rotor. The piston edges or faces 31a and 31b operate to cover all or a portion of the bores 32a and 32b. In FIG. 6, the edges cover on the left shoulder and a part of the bore 32a, while they leave the bore 32b on the right side of the cylinder open during the return of the piston. In the piston position at the left end of the cylinder indicated by the solid lines, a smaller amount of fluid will flow through the apertures 32a and the aperture 32b into the cylinder compartment 55 via the equalizing channel 33 than will be the case when the piston 31 moves to the dotted line position to the right end of the cylinder.

Figure 7:
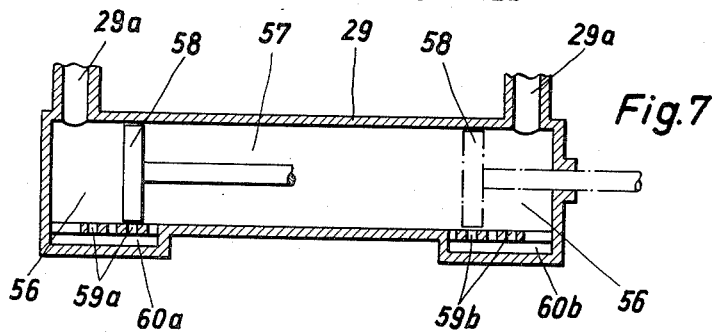
FIG. 7 is a view similar to FIG. 5 of another embodiment of cylinder.

FIG. 7 shows an arrangement which must be selected when the driving frequency of the wobble plate and of the pump piston resp. is under the natural frequency of the oscillating rotor blades $W>We$. In this case the dead spaces have in the reversed positions a lower pressure than the large cylinder spaces on the other side of the piston. The end or dead spaces 56 are connected through equalizing channels 60a and 60b back to a main portion of the cylinder 57. In this embodiment, two channels are employed at each end of the cylinder and they both feed back in a more or less degree from the main portion 57 to the dead space 56 depending upon the operational position of the piston.

Figure 8:
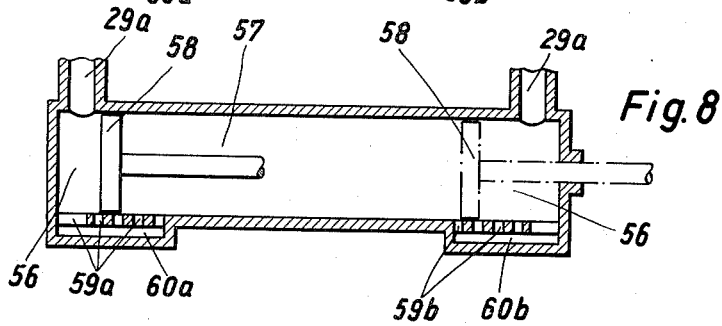
FIG. 8 is a view corresponding to FIG. 7 with the piston indicated moved out.

FIG. 8 is an arrangement of FIG. 7 in which the actuating piston is off course toward the left. In this arrangement the fluid flows from the space 57 through the equalizing channel 60a into the compartment 56 to push back the actuating piston 58 into its precalculated path. At the other cylinder end the equalization takes place in a reverse order.

Figure 5:
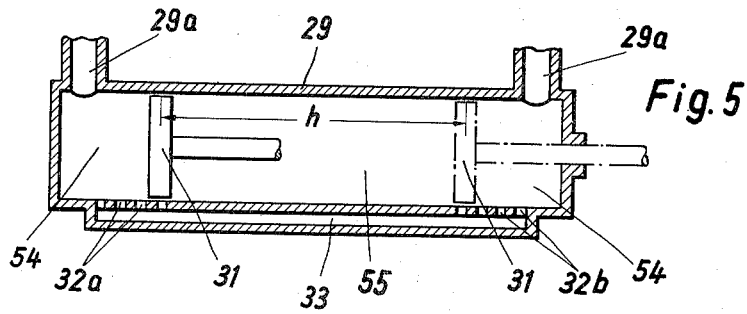
FIG. 5 is a sectional view of an actuating cylinder and piston assembly of the hydraulic system.
Figure 9:
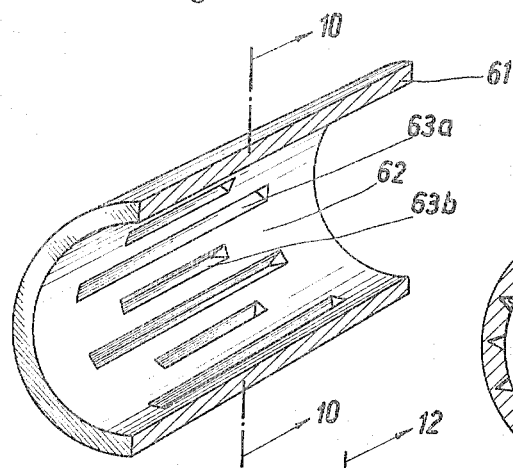
FIG. 9 is a perspective longitudinal section of a cylinder jacket employed in the hydraulic system.
Figure 10:
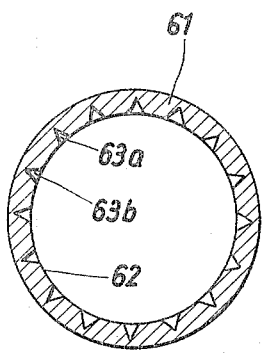
FIG. 10 is a section taken along line 10—10 of FIG. 9.

In FIGS. 9 and 10 there is indicated a cylinder jacket construction for an actuating cylinder 61 which operates in a manner similar to the embodiments indicated in FIG. 5 and FIG. 6. The cylinder wall 62 is provided with recesses in the form of grooves 63a and 63b which run parallel to the cylinder axis and which extend between the two ideal dead center positions of the actuating piston and terminate adjacent each end of the cylinder. The grooves 63a and 63b are of different length so that different stability values can be realized. For the same reason, the grooves are provided with different cross sections.

The direction of the pressure in the dead center positions of the piston 8 depends on the ratio of the driving frequency of the wobble plate W to the natural frequency of the pendulum We. If the driving frequency is slightly above the natural frequency $W>We$, there is an overpressure in the dead spaces of the cylinder compared to the larger cylinder chamber.

Figure 11:
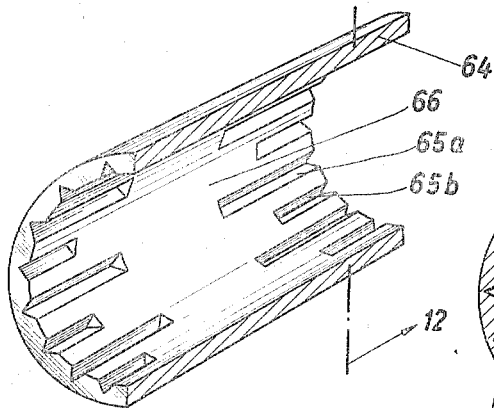
FIG. 11 is a perspective longitudinal section of another embodiment of cylinder construction.
Figure 12:
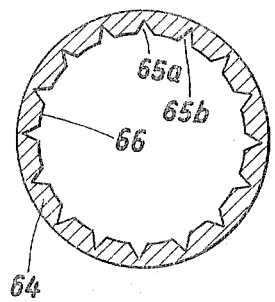
FIG. 12 is a section on line 12—12 of FIG. 9.

In FIGS. 11 and 12 another embodiment of the cylinder 64 is shown with the recesses or grooves 65a and 65b arranged parallel to the cylinder axis and located adjacent each end thereof $W<We$.

While specific embodiments of the invention have been shown and described in detail to illustrate the application of the inventive principles, it will be understood that the invention may be embodied otherwise without departing from such principles.

The embodiments of the invention in which an exclusive property or privilege is claimed are defined as follows:

1. In a helicopter rotor construction including a rotatable rotor head, a plurality of rotor blades each pivotally mounted at their inner ends on said rotor head for periodic pivotal lead-lag movement about a lead-lag axis substantially parallel to the axis of rotation of said rotor in agreement with their natural frequency, said rotor blades including at least one hydraulic system connected to said rotor head and operated by rotation of said rotor head and also connected to said blades for shifting the latter about their lead-lag axes during rotation of said head, said hydraulic system including: at least one actuating cylinder mounted on said rotor head with an actuating piston slideable therein separately connected to each blade for shifting the connected blade about its lead-lag axis for moving all of said rotor blades in accordance with the pendulum frequency of said rotor blades as said head is rotated and pump means connected to said actuating cylinder for supplying fluid thereto for controlling the movement of said actuating piston; and means connected to said pump means and to said rotor to actuate said pump means to reciprocatee said actuating piston in timed relation to the rotation of said rotor head.

2. In a helicopter rotor construction including a rotatable rotor head, a plurality of rotor blades each pivotally mounted at their inner ends on said rotor head for periodic pivotal lead-lag movement about a lead-lag axis substantially parallel to the axis of rotation of said rotor in agreement with their natural frequency, said rotor blades including at least one hydraulic system connected to said rotor head and operated by rotation of said rotor head and also connected to said blades for shifting the latter about their lead-lag axes during rotation of said head, said hydraulic system including at least one actuating cylinder with an actuating piston slidable therein separately connected to each blade for shifting the connected blade about its lead-lag axis for moving all of said rotor blades in accordance with the pendulum frequency of said rotor blades as said head is rotated, a hydraulic pump having a pump cylinder, a pump piston slidable therein separating opposite ends thereof, the opposite ends of said pump cylinder being respectively connected to the opposite ends of said actuating cylinder, and wobble plate means connected to said helicopter rotor and arranged to operate said hydraulic pump to cause said pump to cyclically pressurize opposite sides of said actuating cylinder and to reciprocate the piston therein in timed relation to rotation of said rotor head.

3. In a helicopter construction according to claim 1, wherein said hydraulic system includes bypass conduit means interconnecting opposite sides of said actuating cylinder, located and constructed to compensate for any unbalancing forces on said rotor to correct the stroke of said actuating piston.

4. In a helicopter according to claim 3, wherein said bypass conduit means includes a passage defined in said actuating piston of said actuating assembly.

5. A helicopter according to claim 3, wherein said bypass conduit means includes a separate conduit connecting opposite sides of said actuating cylinder.

6. In a helicopter construction including a rotatable rotor head, a plurality of rotor blades each pivotally mounted at their inner ends on said rotor head for periodic pivotal lead-lag movement about a lead-lag axis substantially parallel to the axis of rotation of said rotor in agreement with their natural frequency, said rotor blades including at least one hydraulic system connected to said rotor head and operated by rotation of said rotor head and also connected to said blades for shifting the latter about their lead-lag axes during rotation of said head, said hydraulic system including at least one actuating cylinder with an actuating piston slidable therein and having a rod portion separately connected to each blade for shifting the connected blade about its lead-lag axis for moving all of said rotor blades in accordance with the pendulum frequency of said rotor blades as said head is rotated, a hydraulic pump having a pump cylinder, a pump piston slidable therein separating opposite ends thereof, the opposite ends of said pump cylinder being respectively connected to the opposite ends of said actuating cylinder, and wobble plate means connected to said helicopter rotor and arranged to operate said hydraulic pump to cause said pump to cyclically pressurize opposite sides of said actuating cylinder and to reciprocate the piston therein, said actuating piston being slidable in fluid-tight engagement with the interior walls of said actuating cylinder, means defining a bypass passage extending from adjacent one end of said actuating cylinder to adjacent the other end, said actuating cylinder having at least one portion adjacent each end of the same in communication with said bypass passage which is uncovered by movement of said piston.

7. In a helicopter according to claim 6, wherein the means defining a bypass passage comprises a plurality of elongated grooves defined in the wall of said actuating cylinder.

8. In a helicopter construction including a rotatable rotor head, a plurality of rotor blades each pivotally mounted at their inner ends on said rotor head for periodic pivotal lead-lag movement about a lead-lag axis substantially parallel to the axis of rotation of said rotor in agreement with their natural frequency, said rotor blades including at least one hydraulic system connected to said rotor head and operated by rotation of said rotor head and also connected to said blades for shifting the latter about their lead-lag axes during rotation of said head, said hydraulic system including at least one actuating cylinder with an actuating piston slidable therein and having a rod portion separately connected to each blade for shifting the connected blade about its lead-lag axis for moving all of said rotor blades in accordance with the pendulum frequency of said rotor blades as said head is rotated, a hydraulic pump having a pump cylinder, a pump piston slidable therein separating opposite ends thereof, the opposite ends of said pump cylinder being respectively connected to the opposite ends of said actuating cylinder, and wobble plate means connected to said helicopter rotor and arranged to operate said hydraulic pump to cause said pump to cyclically pressurize opposite sides of said actuating cylinder and to reciprocate the piston therein, said actuating piston being slidable in fluid-tight engagement with the interior walls of said actuating cylinder, means defining a bypass passage extending from adjacent one end of said actuating cylinder to adjacent the other end, comprising a plurality of grooves of varying length defined in a wall of said actuating cylinder.

9. In a helicopter construction including a rotatable rotor head, a plurality of rotor blades each pivotally mounted at their inner ends on said rotor head for periodic pivotal lead-lag movement about a lead-lag axis substantially parallel to the axis of rotation of said rotor in agreement with their natural frequency, said rotor blades including at least one hydraulic system connected to said rotor head and operated by rotation of said rotor head and also connected to said blades for shifting the latter about their lead-lag axes during rotation of said head, said hydraulic system including at least one actuating cylinder with an actuating piston slidable therein and having a rod portion separately connected to each blade for shifting the connected blade about its lead-lag axis for moving all of said rotor blades in accordance with the pendulum frequency of said rotor blades as said head is rotated, a hydraulic pump having a pump cylinder, a pump piston slidable therein separating opposite ends thereof, the opposite ends of said pump cylinder being respectively connected to the opposite ends of said actuating cylinder, and wobble plate means connected to said helicopter rotor and arranged to operate said hydraulic pump to cause said pump to cyclically pressurize opposite sides of said actuating cylinder and to reciprocate the piston therein, said actuating piston being slidable in fluid-tight engagement with the interior walls of said actuating cylinder, means defining a bypass passage extending from adjacent one end of said actuating cylinder to adjacent the other end, including an orifice defined in said piston.

10. A pivot drive for a helicopter, comprising a rotatable rotor head, a plurality of rotor blades pivotally mounted at their inner ends on said head for pivotal movement about a lead-lag axis substantially parallel to the axis of rotation of said rotor head, a hydraulic actuating cylinder and piston assembly mounted on said rotor head and connected to each of said blades for pivoting each rotor blade about its lead-lag axis in agreement with its natural frequency, said actuating piston being slideable in said actuating cylinder and being connected to said rotor blade for shifting said blade about its lead-lag axis, pump means connected to said rotor head and to all of said actuating cylinder and piston assemblies, said pump means including at least one pump cylinder and a pump piston connected to said rotor head and reciprocable in said pump cylinder in timed relationship to rotation of said rotor head to alternately pressurize opposite sides of said actuating cylinders and to reciprocate said actuating piston therein and cause pivotal movement of said rotor blade, and bypass passage means connecting opposite ends of said actuating cylinder permitting corrective movement of said actuating piston in the event of unbalancing forces acting on said rotor blade.

11. A pivot drive according to claim 10, including a wobble plate carried by said rotor head and driven thereby and wherein said pump piston is articulated by said wobble plate.

12. A pivot drive according to claim 10, wherein said actuating cylinder is pivotally mounted at one end on said rotor head, said actuating piston being pivotally connected to said rotor blade at the opposite end of said cylinder.

13. A pivot drive according to claim 10, a wobble plate pivotally mounted concentrically to the rotor axis, said wobble plate including an outer ring which rotates around a central stationary ring which is pivotally mounted, said outer ring being connected to said rotor for rotation therewith, said pump cylinder being pivotally connected to said rotor head at one end and having a piston rod connected at one end to said pump piston and pivotally connected to said outer ring of said wobble plate at its opposite end.

14. A pivot drive for a helicopter according to claim 10, wherein said actuating cylinders are located within said rotor head, said rotor including a substantially vertical shaft, said pump cylinders being located around said shaft, and conduit means interconnecting said actuating and pump cylinders extending through said rotor shaft.

15. A helicopter rotor according to claim 14, wherein said conduit means includes flexible tubing to permit relative movement between the parts.

16. A pivot drive for a helicopter according to claim 10, wherein said rotor includes an even number of rotor blades, including one actuating cylinder and piston assembly for each rotor blade for operating the latter, the actuating assemblies of two opposing blades being interconnected in series.

17. In a helicopter rotor comprising a rotatably rotor shaft, a rotor head portion connected to the upper end of said shaft for rotation therewith, rotor blades pivotally mounted at their inner ends on said rotor head portion for pivotal movement about a lead-lag axis substantially parallel to said shaft in agreement with their actual frequency, adjustable wobble plate means connected to said rotor head and having a portion thereby rotatable in timed relationship to rotation of said rotor head for driving a hydraulic pump, the improvement comprising one hydraulic blade actuating cylinder and piston assembly for each blade including a cylinder mounted on said rotor head and a piston slidable in said cylinder wall having a piston rod connected to an associated rotor blade for pivoting said rotor blade carried by said rotor head, a hydraulic pump including a pump cylinder connected to said rotor head and a pump piston reciprocable therein and operatively connected to said wobble plate means for actuation thereby, conduit means connecting said pump cylinder to said actuating cylinder in a manner such that reciprocation of the piston therein alternately pressurizes said actuating cylinder on opposite sides of said actuating piston, and fluid bypass means connected to opposite ends of each of said actuating cylinders permitting controlled bypassing of fluid therefrom during operation of the piston therein.

18. A pivot drive according to claim 17, including two blade actuating cylinder and piston assemblies mounted diametrically opposite one another on said rotor head and conduit means interconnecting opposite ends of said blade actuating assemblies, the other ends being connected to respective sides of said pump cylinder.

19. A pivot drive according to claim 17, wherein said blade actuating cylinder and piston assembly comprises a cylinder having at least one elongated groove defined at the interior thereof comprising said bypass means.

20. A pivot drive according to claim 19, wherein the elongated groove is defined at each end of said cylinder.

21. A pivot drive according to claim 19, wherein said groove is defined adjacent at least one end of said cylinder.

References Cited by the Examiner

UNITED STATES PATENTS

| | | | |
|---|---|---|---|
| 1,870,928 | 8/32 | Smith | 170—160.33 |
| 2,021,470 | 11/35 | Upson | 170—160.25 |
| 2,439,089 | 4/48 | Hodson | 170—160.25 |
| 2,465,681 | 3/49 | Gluhareff | 170—160.55 |
| 2,483,480 | 10/49 | Stalker | 170—160.25 |
| 2,540,543 | 2/51 | Neville | 170—135.26 X |
| 2,704,128 | 3/55 | Papadakos | 170—160.27 |
| 2,774,553 | 12/56 | Jensen | 170—160.55 X |

FOREIGN PATENTS

| | | |
|---|---|---|
| 1,015,318 | 9/57 | Germany. |

JULIUS E. WEST, *Primary Examiner.*

ABRAM BLUM, *Examiner.*